March 7, 1950     H. E. THORNHILL     2,499,614

VALVE COVER

Filed July 16, 1945

Homer E. Thornhill.
INVENTOR.

BY J. Vincent Martin
Ralph R. Browning
ATTORNEYS

Patented Mar. 7, 1950

2,499,614

UNITED STATES PATENT OFFICE 2,499,614

VALVE COVER

Homer E. Thornhill, Houston, Tex.

Application July 16, 1945, Serial No. 605,352

8 Claims. (Cl. 103—228)

This invention relates to valve covers for pumps and the like, and more particularly to such pumps or the like as are provided with poppet valves.

As is well known, it is the common practice, where poppet valves are mounted in the cylinder head of a pump or the like to provide a so-called valve cover secured to the head by means of bolts and adapted to be removed when desired so as to afford access to the valve. Such valve covers are held in place by a substantial number of studs or the like, and are sealed to the cylinder head by means of a gasket. When such a cover is being replaced after having been removed, it is usually necessary to install a new gasket. Furthermore, when pressure is exerted on the inside of the cover, such pressure tends to lift the valve cover away from the cylinder head, stretching the studs or bolts holding it in place, and loosening the gasket so as to tend to permit leakage.

One object of the invention is to provide a valve cover which is held in place by a single threaded member and which does not employ the customary gasket, so that this cover may be removed when desired simply by unscrewing such single threaded member.

This single threaded member may be set directly into the cylinder head or body, or it may be set into a part similar to the usual valve cover which is held on by bolts except that such part has an opening therethrough affording access to the valve. In this case, when it is desired to obtain access to the valve, the part referred to is not removed, but remains in place, and may, if desired, be welded to the cylinder head to avoid any likelihood of leakage due to loosening or failure of the gasket.

Another object of the invention is to provide means for sealing my improved valve cover in place in such a way that when pressure is applied thereto it will tend to become tighter rather than looser.

Figure 1:
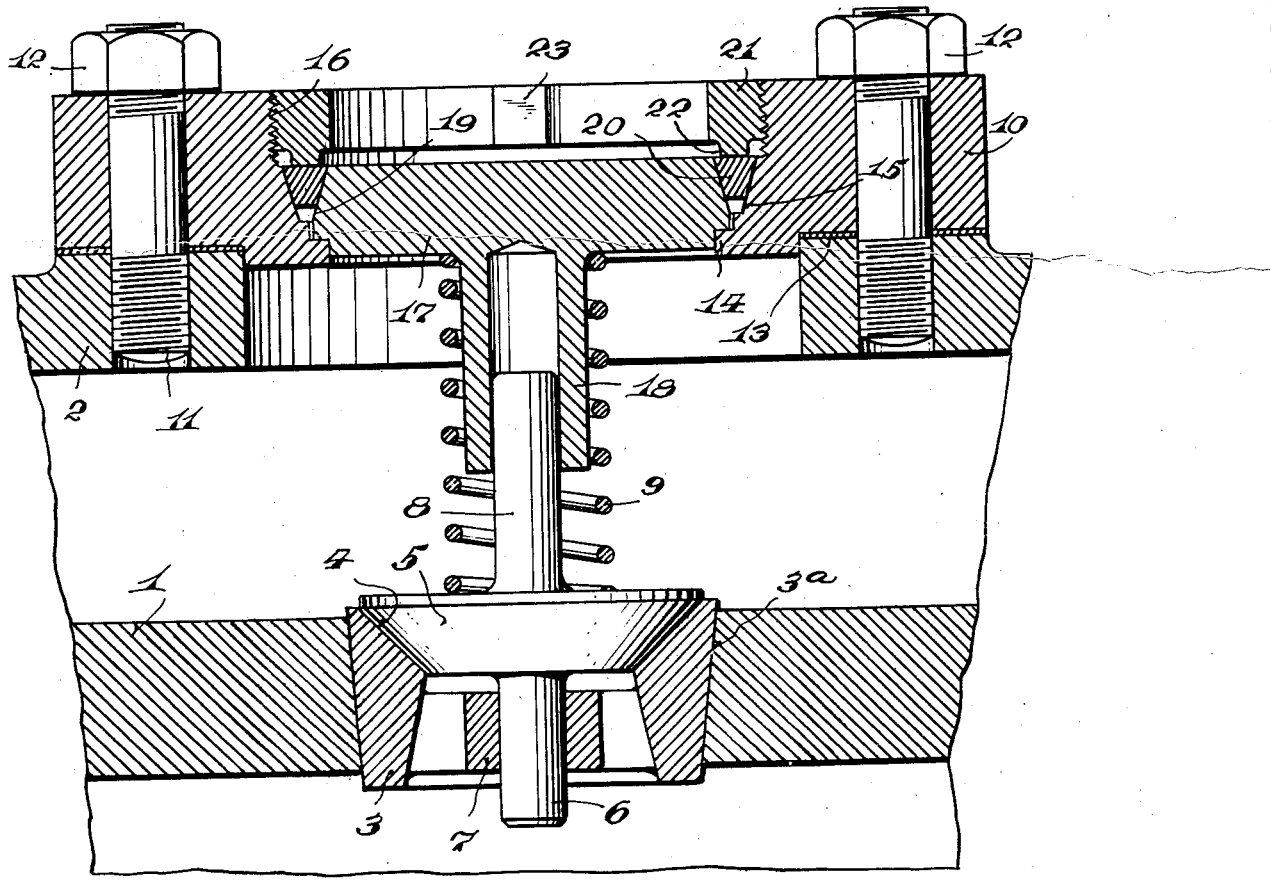
Figure 2:
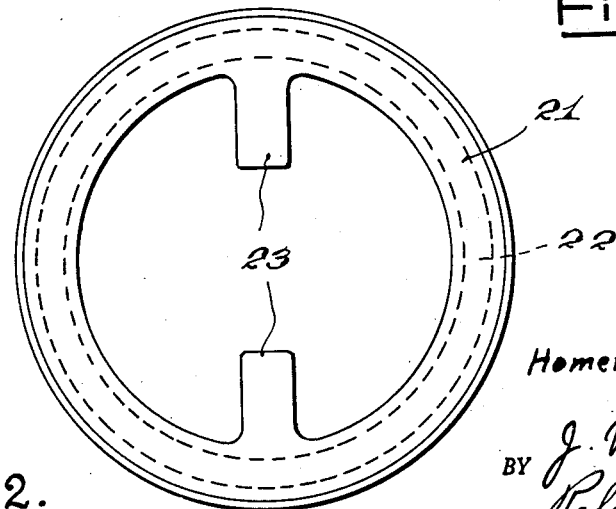

In order that the invention may be readily understood, reference is had to the accompanying drawing forming part of this specification and in which:

Fig. 1 is a fragmentary longitudinal section through a conventional cylinder head showing the usual poppet valve and illustrating my improved valve cover, and Fig. 2 is a plan view of the improved locking ring or threaded member which I employ to hold the valve cover in position.

Referring to the drawings in detail, the valve chamber has an inner wall or partition 1 and an outer wall 2. In the inner wall 1 is an opening in which is set the usual valve seat 3, having a tapered fit therein as shown at 3a, and also having at its outer end a tapered seat 4 on which seats the poppet valve 5. This valve 5 has a stem 6 projecting from the inner end thereof and working freely through a guide bracket or spider 7 carried by the valve seat 3. It also has a stem 8 extending from the outer side thereof, and is held to its seat by means of a helical spring 9.

A valve cover of the usual type except for a large opening therethrough centrally thereof is shown at 10, and this is held to the outer wall 2 of the valve chamber by means of bolts or studs 11, having nuts 12, a sealing gasket 13 being interposed between the parts.

As already stated, the object of the present invention is to avoid the necessity of removing this cover 10. It is intended that it may remain permanently in place, and may, if desired, be welded to the outer wall 2 for the purpose above set forth.

To this end, I form the opening mentioned, in the center of the cover 10, and provide, at the inner edge of such opening, an annular flange or shoulder 14. Outside of this shoulder, the edge of the opening in the cover 10 is beveled or flared outwardly, as shown at 15. Furthermore, the extreme outer portion of the edge of the opening in the cover 10 beyond the flared portion 15 is threaded, as shown at 16. On the shoulder 14 I place a plug or closure 17, of novel construction. This plug has, extending from the inner side thereof, a guide sleeve 18 adapted to receive the stem 8 of the valve 5, and the helical spring 9 surrounds the sleeve 18 and bears at its outer end against the inner surface of the plug 17.

The edge of the plug 17, opposite the flared portion 15 of the cover 10, is also flared or tapered, but in the opposite direction, as shown at 19, these two oppositely flared surfaces 15 and 19 providing between them a tapered annular groove. In this groove seats a sealing ring 20, wedged-shaped in cross section, and this sealing ring is held in place by a locking ring 21, having on its periphery threads engaging the threaded portion 16 of the cover plate 10, and having on its inner face an annular rib 22 adapted to bear upon the outer or wide edge of the sealing ring 20. The locking ring 21 is further provided with lugs 23 projecting inwardly therefrom and adapted to be engaged by a suitable wrench by which the ring may be turned.

It will of course be understood that the opening in the cover plate 10 is made large enough to permit not only the valve 5, but the valve seat 3, to be withdrawn therethrough. With my improved construction therefore, it will be obvious that when it is desired to withdraw the valve or valve seat, it is only necessary to unscrew the locking ring 21 and remove the plug 17. In other words, it is necessary to release only one single threaded member, instead of the usual plurality of bolts.

It will further be seen that when pressure is exerted on the inside of the plug 17 in such a way as to tend to move the plug outwardly, such outward movement, due to the tapered or inclined surfaces of the sealing ring and groove, will tend to spread or expand the sealing ring radially and force it into tighter sealing engagement with the walls of the groove. Thus the greater the pressure, the tighter will be the seal.

While I have shown my improved plug and sealing and locking rings as mounted in a plate 10, similar to the usual cover plate except for the central opening therein, it will be understood that these parts can, if desired, be mounted directly in an opening similar to said central opening but formed directly in the wall 2 of the valve chamber. From a practical standpoint however, where it is desired to equip existing cylinders with my improved plug and ring, it is preferable to mount these parts in a member similar to the usual cover plate, as shown, so that a cover plate of this type, equipped with my improvements, may be substituted for the standard cover plate with which the cylinder was originally provided.

What I claim is:

1. The combination with a pump body having a poppet valve mounted therein, of a plate member spaced from said valve and having an opening therein registering with said valve, and through which said valve may be removed, said opening having an inturned flange adjacent the inner surface of the plate member, a removable plug fitting within said opening engaging the flange, and a locking ring threaded into said plate member for holding said plug in position.

2. The combination with a pump body having a poppet valve mounted therein, provided with a stem, of a plate member spaced from said valve and having an opening therein registering with said valve, and through which said valve may be removed, said opening having an inturned flange adjacent the inner surface of the plate member, a removable plug fitting within said opening engaging the flange and having formed integral therewith a hollow guide adapted to receive said valve stem, and a single threaded member engaging said plate for holding said plug in position.

3. The combination with a pump body having a removable valve seat mounted therein, and a poppet valve co-operating with said seat, of a plate member spaced from said valve and seat and having an opening therein registering with said seat and through which said seat may be removed, said opening having an inturned flange adjacent the inner surface of the plate member, a removable plug fitting within said opening engaging said flange, a tapered groove formed between the plug and plate member, a seal ring wedge-shaped in cross section within the groove and a single member threadedly engageable with said plate member and adapted to force the seal ring into the groove for securing said plug in sealed position.

4. The combination with a cylinder head having a poppet valve mounted therein, provided with a stem, of a cover plate secured to said head and having an opening therein registering with said valve, a removable plug supported within said opening for closing the same and having formed integral therewith a hollow guide adapted to receive said valve stem, and a member threadedly engaging said plate member for holding said plug in position.

5. The combination with a plate member having an opening surrounded by a peripheral flange which opening communicates with a pressure chamber, of a plug closing said opening and supported on said flange, the edge portion of said plug above said flange being of conical shape, whereby an annular tapered groove is formed between said edge and the adjacent edge of said opening, a sealing ring, wedge-shaped in cross-section, positioned in said groove, and means for forcing said ring into said groove toward the narrower part thereof to provide a seal and to hold said plug in position against said flange.

6. The combination with a plate member having an opening surrounded by a peripheral flange which opening communicates with a pressure chamber, of a plug closing said opening and supported on said flange, the edge portion of said plug above said flange being of conical shape, whereby an annular tapered groove is formed between said edge and the adjacent edge of said opening, a sealing ring, wedge-shaped in cross-section, positioned in said groove, and a locking ring, threaded into said plate member, and engaging said sealing ring so as to force it into said groove whereby manipulation of the locking ring alone is effective to make and break the seal.

7. The combination with a plate member having an opening surrounded by a peripheral flange which opening communicates with a pressure chamber, of a plug closing said opening and supported on said flange, a sealing ring interposed between the edge of said plug and the adjacent edge of said opening, and means for clamping said sealing ring in position with the plug abutting said flange, said sealing ring and the edges of the parts which it engages having co-operating inclined surfaces so constructed that any tendency of said plug to move away from said flange will spread the sealing ring radially and thus force it into tighter engagement with such parts.

8. A closure device for the poppet valve access opening in a pump body including, an annular supporting means surrounding said access opening, a plug supported upon said means and closing said opening, a flexible sealing ring encircling the upper portion of the plug for sealing the space between the peripheral edge of the plug and the wall of the bore, and retaining means threaded into the access opening for engaging the sealing ring to urge said ring and plug downwardly, the peripheral edge of the plug and the wall of the bore having oppositely inclined surfaces, whereby any upward movement of the plug away from its supporting means increases the sealing effect of the sealing ring.

HOMER E. THORNHILL.

REFERENCES CITED

The following references are of record in the file of this patent:

UNITED STATES PATENTS

| Number | Name | Date |
| --- | --- | --- |
| 1,006,852 | Kelsey | Oct. 24, 1911 |
| 1,827,725 | Baker | Oct. 20, 1931 |
| 1,966,264 | Roye | July 10, 1934 |
| 2,321,597 | Hobbs | June 15, 1943 |
| 2,396,469 | Meigs | Mar. 12, 1946 |